(12) United States Patent  (10) Patent No.: US 6,711,849 B1
Moretti  (45) Date of Patent: Mar. 30, 2004

(54) ADJUSTABLE CHUM BUCKET

(76) Inventor: Michael Moretti, 122 Trafalgar Dr., Shirley, NY (US) 11967

( * ) Notice: Subject to any disclaimer, the term of this patent is extended or adjusted under 35 U.S.C. 154(b) by 0 days.

(21) Appl. No.: 10/199,827

(22) Filed: Jul. 19, 2002

(51) Int. Cl.⁷ .............................................. A01K 97/02
(52) U.S. Cl. .................................................... 43/44.99
(58) Field of Search ........................... 43/44.99, 55, 56

(56) References Cited

U.S. PATENT DOCUMENTS

| 455,758 | A | | 7/1891 | Moulsong | |
|---|---|---|---|---|---|
| 758,434 | A | | 4/1904 | Forster | |
| 1,497,199 | A | | 6/1924 | Sutthoff | |
| 1,620,617 | A | * | 3/1927 | Marsh | 43/44.99 |
| 1,807,712 | A | | 6/1931 | Spofford | |
| 2,614,358 | A | * | 10/1952 | Adams | 43/44.99 |
| 2,709,317 | A | | 5/1955 | Pease, Sr. | |
| 2,713,744 | A | * | 7/1955 | Strausser | 43/44.99 |
| 2,729,912 | A | * | 1/1956 | Moffett | 43/44.99 |
| 2,941,327 | A | | 6/1960 | Rundell | |
| 3,163,959 | A | | 1/1965 | Hollar | |
| 3,974,591 | A | | 8/1976 | Ray | |
| 4,297,804 | A | | 11/1981 | Weld | |
| 4,829,705 | A | | 5/1989 | Dorsey | |
| 5,913,672 | A | | 6/1999 | Nicholson | |
| 6,138,400 | A | | 10/2000 | Gervae | |
| 6,301,824 | B1 | * | 10/2001 | Ashlock | 43/44.99 |
| 6,453,602 | B1 | * | 9/2002 | Russell | 43/100 |

FOREIGN PATENT DOCUMENTS

FR 1366951 * 6/1964 ................ 43/44.99

* cited by examiner

Primary Examiner—Kurt Rowan
(74) Attorney, Agent, or Firm—Michael I Kroll

(57) ABSTRACT

A chum bucket with adjustable release apertures has multiple settings suitable for regulating the release of various sized chum and live bait. A locking device prevents misalignment of release openings in an inner container and outer container that align to enable the release.

10 Claims, 14 Drawing Sheets

ADJUSTABLE CHUM BUCKET

BACKGROUND OF THE INVENTION

1. Field of the Invention

The present invention relates generally to bait-buckets and, more specifically, to a chum bucket comprised of interlocking containers having a locking mechanism for maintaining the user selectable positioning of one container relative to the other container.

2. Description of the Prior Art

There are other chum device designed for bait delivery. Typical of these is U.S. Pat. No. 455,758 issued to Moulsong on Jul. 14, 1891.

Another patent was issued to Forster on Apr. 26, 1904 as U.S. Pat. No. 758,434. Yet another U.S. Pat. No. 1,497,199 was issued to Sutthoff on Jun. 10, 1924 and still yet another was issued on Jun. 2, 1931 to Spofford as U.S. Pat. No. 1,807,712.

Another patent was issued to Pease, Sr. on May 31, 1955 as U.S. Pat. No. 2,709,317. Yet another U.S. Pat. No. 2,941,327 was issued to Rundell on Jun. 21, 1960. Another was issued to Hollar on Jan. 5, 1965 as U.S. Pat. No. 3,163,959 and still yet another was issued on Aug. 17, 1976 to Ray as U.S. Pat. No. 3,974,591.

Another patent was issued to Weld on Nov. 3, 1981 as U.S. Pat. No. 4,297,804. Yet another U.S. Pat. No. 4,829,705 was issued to Dorsey on May 16, 1989. Another was issued to Nicholson on Jun. 22, 1999 as U.S. Pat. No. 5,913,672 and still yet another was issued on Oct. 31, 2000 to Gervae as U.S. Pat. No. 6,138,400.

U.S. Pat. No. 455,758

Inventor: Silvine Moulsong

Issued: Jul. 14, 1891

The invention is an improvement in bait-cages. The cage is for holding bait and is to be raised and lowered from the anchor chain or cable, and by means of which the bait which is to be fed to the fish can be kept around the vessel and prevented from being carried away by the movement of the water.

U.S. Pat. No. 758,434

Inventor: Ferdinand E. Forster

Issued: Apr. 26, 1904

The invention relates to means for feeding chum or free bait for the purpose of attracting fish to the vicinity of the fisherman. In feeding chum by hand or machine upon the surface of the water, especially in strong currents, the bait is distributed over too great an area or is liable to be carried away by the tide or currents. The object of the invention is to provide means whereby the chum may be delivered on or near the bottom at the point desired.

U.S. Pat. No. 1,497,199

Inventor: John H. Sutthoff

Issued: Jun. 10, 1924

The invention is to provide an infuser that is neat in appearance, easy to operate, strong, simple and compact in construction, not expensive to manufacture and that is efficient in permitting the extraction of the soluble and aromatic substances from material that may be contained therein. The infuser comprises a plurality of sections hinged together in such a manner that certain sections are adapted to be swung or rotated within certain other sections to discharge or eject used material therefrom after brewing an infusion.

U.S. Pat. No. 1,807,712

Inventor: Gordon E. Spofford

Issued: Jun. 2, 1931

The invention is to provide a device a body adapted to contain live bait, a perforated closure for one end of the body, a normally closed valve for the opposite end of the body, and means to facilitate securing the device to a fish line.

U.S. Pat. No. 2,709.317

Inventor: Arthur R. Pease, Sr.

Issued: May 31, 1955

The invention is, in combination with a chum holder, a perforated cylindrical body, a cap affixed toe the upper end of said body and securely fastened thereto, a removable cap having spring fingers adapted to penetrate within the interior of the bottom of said body, a cord extending through the upper cap and lower cap and a collar secured on said cord adapted to hold said removable cap in closed position with the fingers within said body.

U.S. Pat. No. 2,941.327

Inventor: Raymond R. Rundell

Issued: Jun. 21, 1960

A chum pot comprising an open bottom body, a closure plate arranged to close the bottom of said body a resilient latch integrally forced on said closure plate for releasably securing said closure plate in closed position with respect to said body, an upwardly and outwardly sloping cam plate integrally secured to said latch to actuate said latch and release said closure plate from closed position upon rapid upward movement of said chum pot through the water, said chum pot having a plurality of weight receiving chambers formed therein and a threaded cover releasably closing the lower ends of said chambers.

U.S. Pat. No. 3,163.959

Inventor: George E. Hollar

Issued: Jan. 5, 1965

The device is a container having a hinged bottom or lid normally retained in a closed position by a pivoted trip-latch. The container is filled with chum and lowered to the desired fishing spot by a line or an equivalent flexible element. The lower portion of the line is slidably connected to the axial center of the top of the container and the terminal end is connected to the trip-latch. The hinged portion of the bottom is provided with a detent releasably engaged by the lower end of the latch. When the loaded container descends to the desired level, the line is forcibly yanked until the latch releases the detent, whereupon the bottom opens and the bait is discharged.

U.S. Pat. No. 3,974.591

Inventor: Otis Eugene Ray

Issued: Aug. 17, 1976

A perforated chum holder and dispenser is formed in two hingedly connected half sections having snap locking means, whereby the device may be closed around either a fishing line float for top fishing or a line sinker for bottom fishing. The opposite ends of the device are grooved to receive a fishing line or leader with a coacting locking element.

U.S. Pat. No. 4,297.804

Inventor: David B. Weld

Issued: Nov. 3, 1981

A floating container, specially adapted to hold live bait, which is shaped like a small boat so that it can be pulled behind a fishing vessel without sinking. The container is transparent so that the bait carried therein can be seen and thus attract game fish in the surrounding water. The container is structured to provide proper aeration for the bait yet allow access to it when needed. Closure doors are positioned to shut independently when the container is being towed.

U.S. Pat. No. 4,829.705

Inventor: Harris J. Dorsey

Issued: May 16,1989

A chum basket having generally frusto-conically shaped sections which are jointed at their larger ends and which have perforations in their side walls, a device on the upper section by which the body may be suspended in the water, and a weight in the lower section to cause the body to assume a vertical position generally coaxial of its sections, the upper section having a door in the side thereof to permit access to the interior of the body.

U.S. Pat. No. 5,913,672

Inventor: John R. Nicholson

Issued: Jun. 22, 1999

A chum delivery assembly for facilitating the rapid and strategic dispersement of chum along a bottom surface of a body of water in order to attract fish, the assembly including a containment member having a base, a surrounding wall surface, and an upper surface which together define an open interior chamber. The open interior chamber is structured to contain a quantity of chum therein, and a lowering line is included and structured to adjustably lower the containment member to a desired delivery location. The base of the chum delivery assembly includes a generally open configuration so as to permit the free passage of the chum therethrough from the open interior chamber, with a rigid panel being provided and disposed to selectively cover the base so as to prevent the free passage of chum through the base until desired. As such, the rigid panel is structured to be removed from a covering orientation over the base when the containment member is substantially at the delivery location such that all of the chum contained in the open interior chamber is released in a substantially concentrated manner at the delivery location.

U.S. Pat. No. 6,138.400

Inventor: Todd A. Gervae

Issued: Oct. 31, 2000

A submersible bait dispenser provides for the release of "chum" or free bait, at a predetermined depth in the water in the vicinity of the baited hook or lure being used by an angler. The dispenser generally comprises a container with a selectively openable door or panel, connected to a line. A deformable catch secures the door or panel in the closed position until opening is desired. The same line used for lowering the dispenser in the water, is also used for opening the panel as desired. The present dispenser is filled with "chum" (either live or killed bait, as desired) and lowered in the water to a predetermined depth, at approximately the same depth as the baited hook or lure being used by the angler; the device may be lowered to rest upon the bottom of the body of water, if so desired. Upon reaching the desired depth, the line is given a sharp tug, which releases the deformable catch and opens the door or panel, thereby releasing the "chum" in the vicinity of the baited hook or lure, where it will serve to attract fish to the vicinity of the baited hook or lure. The device may then be retrieved using the remote lowering and release line, for reuse as desired. The present submersible bait dispenser may include some form of ballast weight therein, as desired, and is preferably formed of non-corrosive materials which are also resistant to freezing, for ease of use in ice fishing.

While these chum delivery devices may be suitable for the purposes for which they were designed, they would not be as suitable for the purposes of the present invention.

SUMMARY OF THE PRESENT INVENTION

A primary object of the present invention is to provide a chum bucket having a plurality of user selectable various sized openings.

Another object of the present invention is to provide a chum bucket that will also serve as a live bait bucket.

Yet another object of the present invention is to provide a chum bucket that can be trolled by a boat during fishing.

Still yet another object of the present invention is to provide a chum bucket comprised of an inner bucket and an outer bucket.

Still yet another object of the present invention is to provide a locking mechanism whereby the outer bucket can be selectively aligned with the inner bucket.

Yet another object of the present invention is to provide indicia on the exterior surface of one bucket and a pointer on the exterior surface of the other bucket whereby alignment of the indicator to one of the plurality of indicia on the other bucket indicates selection of water flow rate through the openings in the buckets.

Additional objects of the present invention will appear as the description proceeds.

The present invention overcomes the shortcomings of the prior art by providing a chum bucket comprised of interlocking containers having a locking mechanism for maintaining the user selectable positioning of one container relative to the other container.

One container serves has the bait carrying container having an attachable- detachable lid.

The chum bucket has means of egress such that the chum placed within the bait carrying container can pass from the inner container.

My invention provides a device for releasing bait of various sizes while submerged in water, the device comprising: a generally circular outer container, having a sidewall, the sidewall having: a first plurality of openings, each opening in the first plurality being substantially the same size, a second plurality of openings, each opening in the second plurality of openings being substantially the same size, each of said openings being smaller than the first plurality openings, a generally circular inner container having a top opening, the inner container being closely received by the outer container for concentric rotation within the outer container, the inner container having a sidewall, the sidewall having a plurality of openings, each opening being substantially the same size, each opening being substantially the same size or smaller than the outer container first plurality of openings, the inner container plurality of openings being positioned such that the inner container is rotatable to: a first position wherein the inner container plurality of openings aligns with the outer container first plurality of openings; a second position wherein the inner container plurality of openings aligns with the outer container second plurality of openings; at least one additional position wherein the inner container plurality of openings is unaligned with the outer container first and second pluralities of openings; a closing member for closing the inner container top opening; and a locking device for fixing the inner container in the first, the second, or the at least one additional position.

In some embodiments, the outer container first plurality of openings comprises four vertically aligned pluralities of openings spaced equidistantly about the outer container circumference; the outer container second plurality of openings comprises four vertically aligned pluralities of openings spaced equidistantly about the outer container circumference; and the inner container plurality of openings comprises four vertically aligned pluralities of openings spaced equidistantly about the outer container circumference, such that when the inner container is in the first position the four inner container vertically aligned opening pluralities align with the four outer container opening pluralities of the outer container first opening plurality.

In some embodiments, the locking device further comprises a locking pin, the outer container sidewall further comprises a locking pin opening, and the inner container sidewall further comprises a plurality of locking pin openings, each inner container locking pin opening being singularly alignable with the outer container locking pin opening, the locking pin being fixedly insertable in the outer container locking pin opening and the inner container locking pin opening so aligned.

In some embodiments, the outer container sidewall pluralities of openings are circular and the inner container plurality of openings are circular.

In some embodiments, the outer container sidewall has a third plurality of openings, each opening in the third plurality of openings being substantially the same size, each of said openings being smaller than the second plurality of openings, the inner container is rotatable to a position such that the inner container plurality of openings aligns with the outer container third plurality of openings, and the locking device fixes the inner container in such position.

In some embodiments, the outer container sidewall has a fourth plurality of openings, each opening in the fourth plurality of openings being substantially the same size, each of said openings being smaller than the third plurality of openings, the inner container is rotatable to a position such that the inner container plurality of openings aligns with the outer container fourth plurality of openings, and the locking device fixes the inner container in such position.

In some embodiments, the outer container sidewall further comprises at least one additional plurality of openings, the openings in each plurality being substantially the same size, the openings in each of the additional pluralities being smaller than the outer container third plurality of openings and larger than the openings in each succeeding additional plurality, the inner container being rotatable such that each additional plurality of openings aligns with the inner container plurality of openings, the inner container being fixable by the locking device in such an aligned position for each additional plurality.

In some embodiments, the inner container further comprises indicia indicating the position of the inner container.

In some embodiments, the indicia also indicates a relative amount of flow at each inner container position.

A device is provided for releasing bait of various sizes while submerged in water, the device comprising: a generally circular outer container having egress means; a generally circular inner container having a top opening, the inner container being closely received by the outer container for rotation within the outer container, the inner container having egress means, the outer container egress means and the inner container egress means aligning in at least two positions of rotation as the inner container is rotated within the outer container, the degree of egress being reduced in the second of the two positions, the inner container being rotatable to at least one position wherein the outer and inner container egress means are unaligned; closing means for closing the inner container top opening; and means for fixing the inner container in any of the aligned and unaligned positions of rotation.

There is provided a device for releasing bait of various sizes while submerged in water, the device comprising: a generally circular outer container, having a sidewall, the sidewall having: a first plurality of openings, each opening in the first plurality being substantially the same size, a second plurality of openings, each opening in the second plurality of openings being substantially the same size, each of said openings being smaller than the first plurality openings, a third plurality of openings, each opening in the third plurality of openings being substantially the same size, each of said openings being smaller than the second plurality openings, a fourth plurality of openings, each opening in the fourth plurality of openings being substantially the same size, each of said openings being smaller than the third plurality openings, a generally circular inner container, closely received by the outer container for concentric rotation within the outer container, the inner container having a sidewall and a top opening, the sidewall having a plurality of openings, each opening being substantially the same size, each opening being substantially the same size or smaller than the outer container first plurality openings, the inner container plurality of openings being positioned such that the inner container is rotatable to: a first position wherein the inner container plurality of openings aligns with the outer container first plurality of openings; a second position wherein the inner container plurality of openings aligns with the outer container second plurality of openings; a third position wherein the inner container plurality of openings aligns with the outer container third plurality of openings; a fourth position wherein the inner container plurality of openings aligns with the outer container fourth plurality of openings; at least one additional position wherein the inner container plurality of openings is unaligned with the outer container first, second, third, and fourth pluralities of openings, the inner container further comprising indicia indicating the relative degree of water flow at each inner container position; a locking pin, the outer container sidewall further comprising a locking pin opening, and the inner container sidewall further comprising a plurality of locking pin openings, each inner container locking pin opening being singularly alignable with the outer container locking pin opening, the locking pin being fixedly insertable in the outer container locking pin opening and the inner container locking pin opening so aligned; and a lid for closing the inner container top opening, and further wherein: the outer container first plurality of openings comprises four vertically aligned pluralities of openings spaced equidistantly about the outer container circumference; the outer container second plurality of openings comprises four vertically aligned pluralities of openings spaced equidistantly about the outer container circumference; the outer container third plurality of openings comprises four vertically aligned pluralities of openings spaced equidistantly about the outer container circumference; the outer container fourth plurality of openings comprises four vertically aligned pluralities of openings spaced equidistantly about the outer container circumference; and the inner container plurality of openings comprises four vertically aligned pluralities of openings spaced equidistantly about the outer container circumference, such that when the inner container is in the first position the four inner container vertically aligned opening pluralities align with the four outer container opening pluralities of the outer container first opening plurality.

A device is provided for releasing bait of various sizes while submerged in water, the device comprising: a generally circular inner container having a top opening and a sidewall, the sidewall having: a first plurality of openings, each opening in the first plurality being substantially the same size, a second plurality of openings, each opening in the second plurality of openings being substantially the same size, each of said openings being smaller than the first plurality openings, a generally circular outer container, closely receiving the inner container for concentric rotation within the outer container, the outer container having a sidewall, the sidewall having a plurality of openings, each opening being substantially the same size, each opening being substantially the same size or smaller than the inner container first plurality openings, the outer container plurality of openings being positioned such that the inner container is rotatable to: a first position wherein the outer container plurality of openings aligns with the inner container first plurality of openings; a second position wherein the outer container plurality of openings aligns with the inner container second plurality of openings; at least one additional position wherein the outer container plurality of openings is unaligned with the inner container first and second pluralities of openings; a lid for closing the inner container; and a locking device for fixing the inner container in the first, the second, or the at least one additional position.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIG. 1 is an illustrative view of an exemplary embodiment of the present invention in use. Shown is the present invention submerged in the water and anchored to a drifting or trolling boat. The present invention, an adjustable chum bucket, allows for variable settings to control the size and amount of chum be released from the bucket. The chum release is adjusted to a setting to provide optimal fishing environment based on type of game fish and other variable fishing conditions.

FIG. 2 is an exploded isometric view of an exemplary embodiment of the present invention. Shown is the present invention inner bait bucket container that is housed within the outer container. The inner bait bucket includes a plurality of release openings that allows for exchange of water that will expel the chum from the bait bucket. In addition, the water exchange ensures maintained fresh water when live bait is used. The flow rate is set by rotating the inner bucket such that the desired flow rate indicator is aligned with the pointer on the outer container. Once aligned, the locking pin is inserted into the locking pin openings in both containers to secure the flow rate setting.

Figure 5:
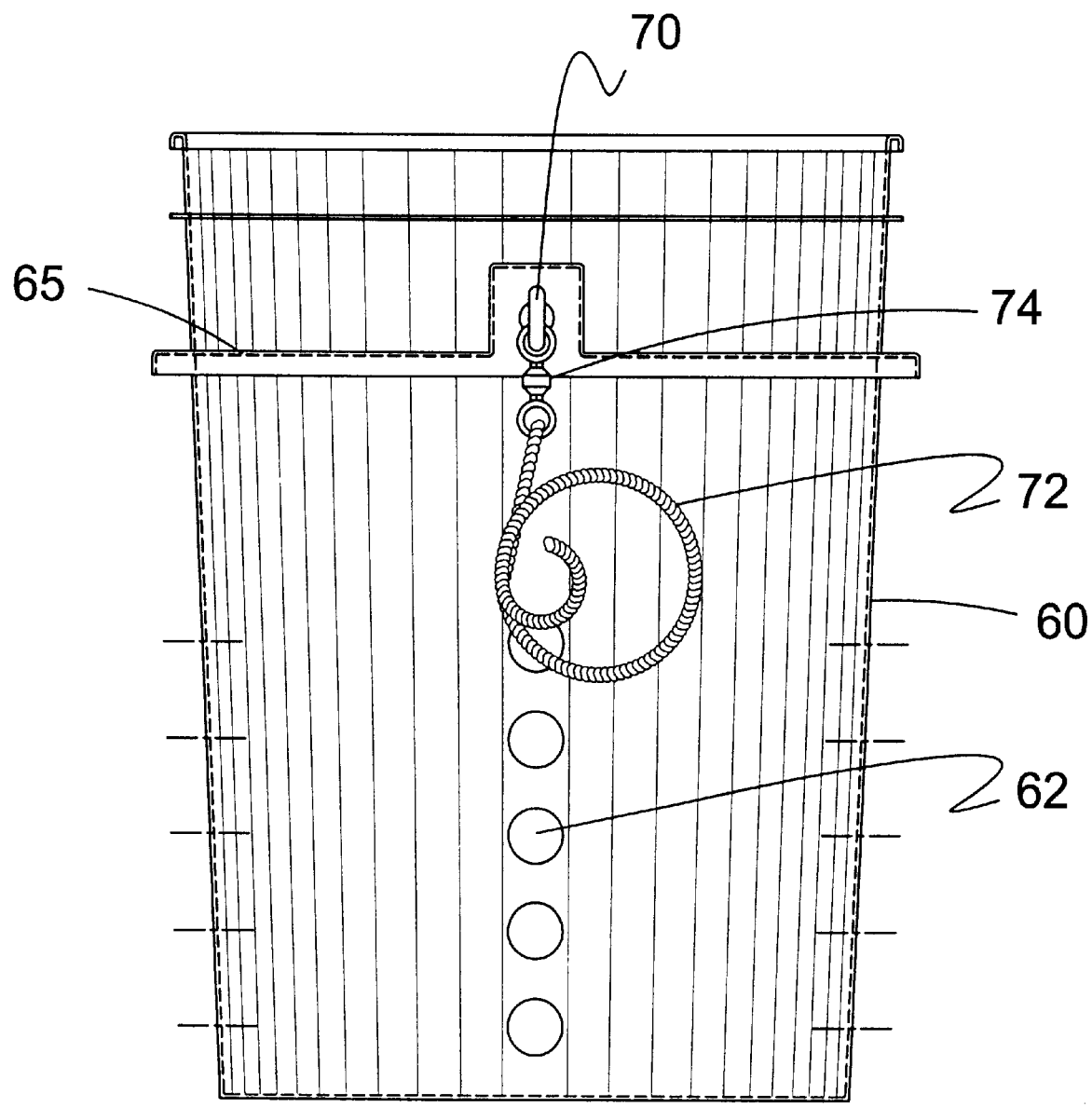

FIG. 5 is a rear view of an exemplary embodiment of the present invention illustrating the rear side of the inner container and the tow rope assembly that connects the bait bucket to the tow rope. When in use, the opposite end of the tow rope is secured to a boat tie-off allowing the chum bucket to be dropped into the water and trolled with the boat. The rope is anchored to the bait bucket using eyelets to allow for free pivoting motion.

Figure 6:
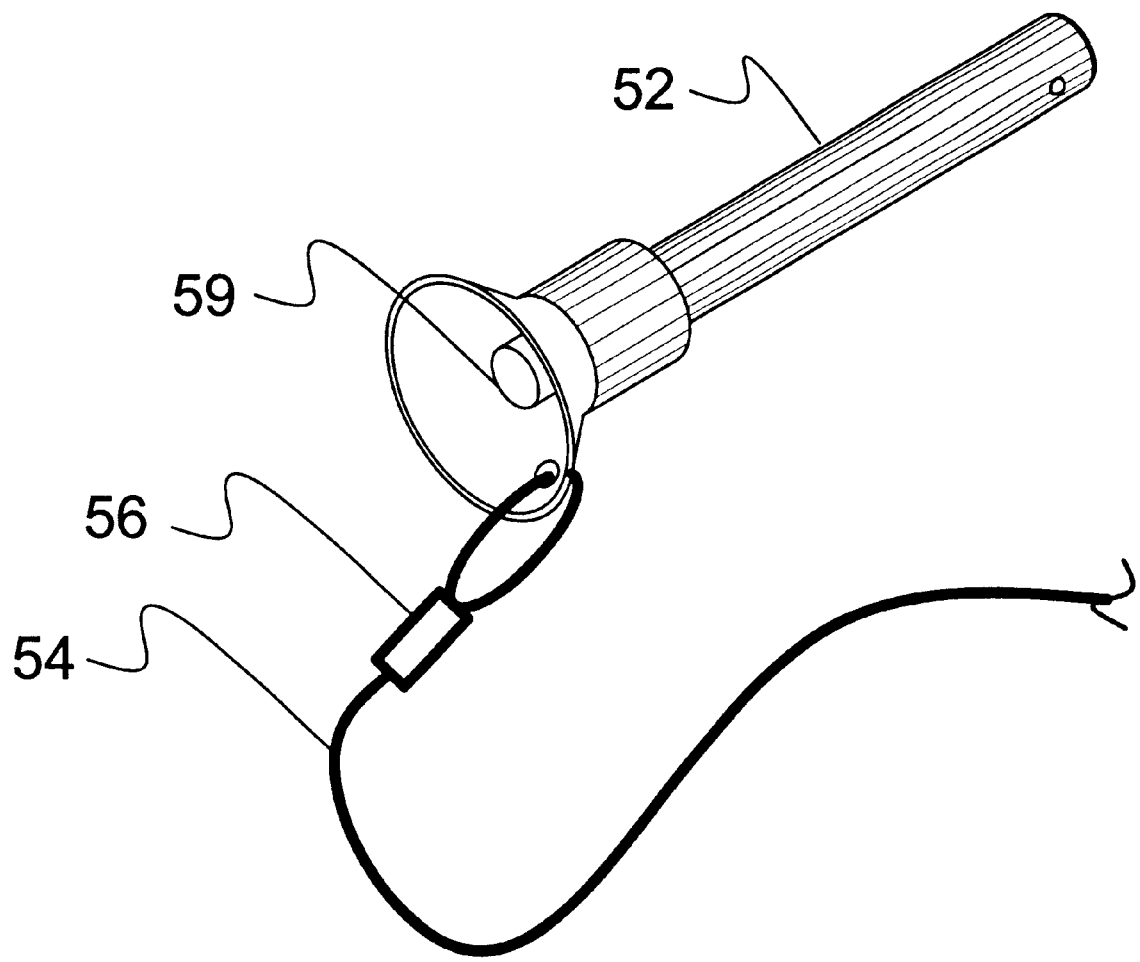

FIG. 6 is an isometric view of the prior art locking pin assembly used with this exemplary embodiment of the present invention. The locking pin can be removed from a secured position by depressing the plunger and pulling the locking pin away from the opening. This anchor assembly will prevent the locking pin from be misplaced or lost in the event of poor engagement.

Figure 7:
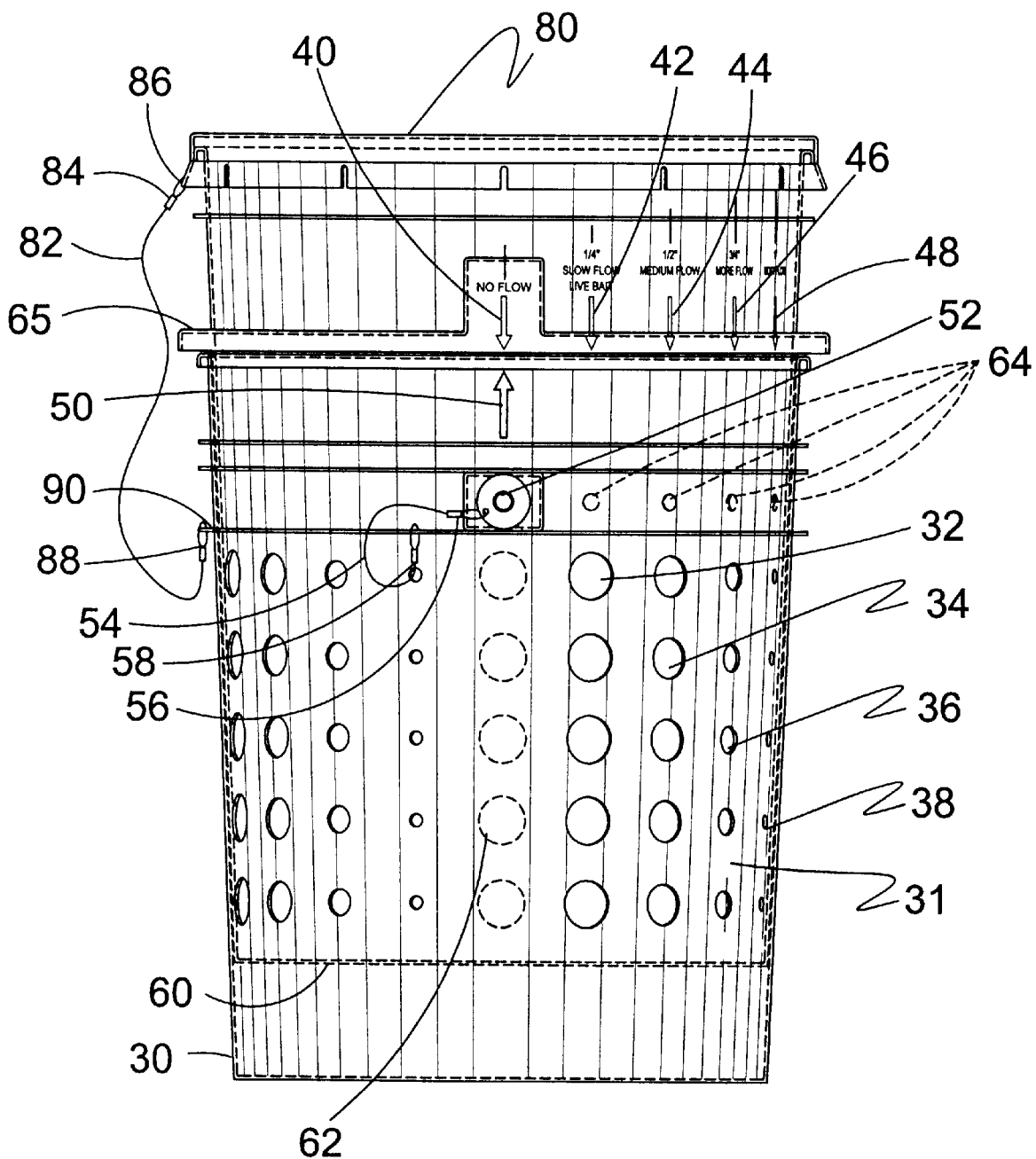

FIG. 7 is a front view of an exemplary embodiment of the present invention.

Figure 8:
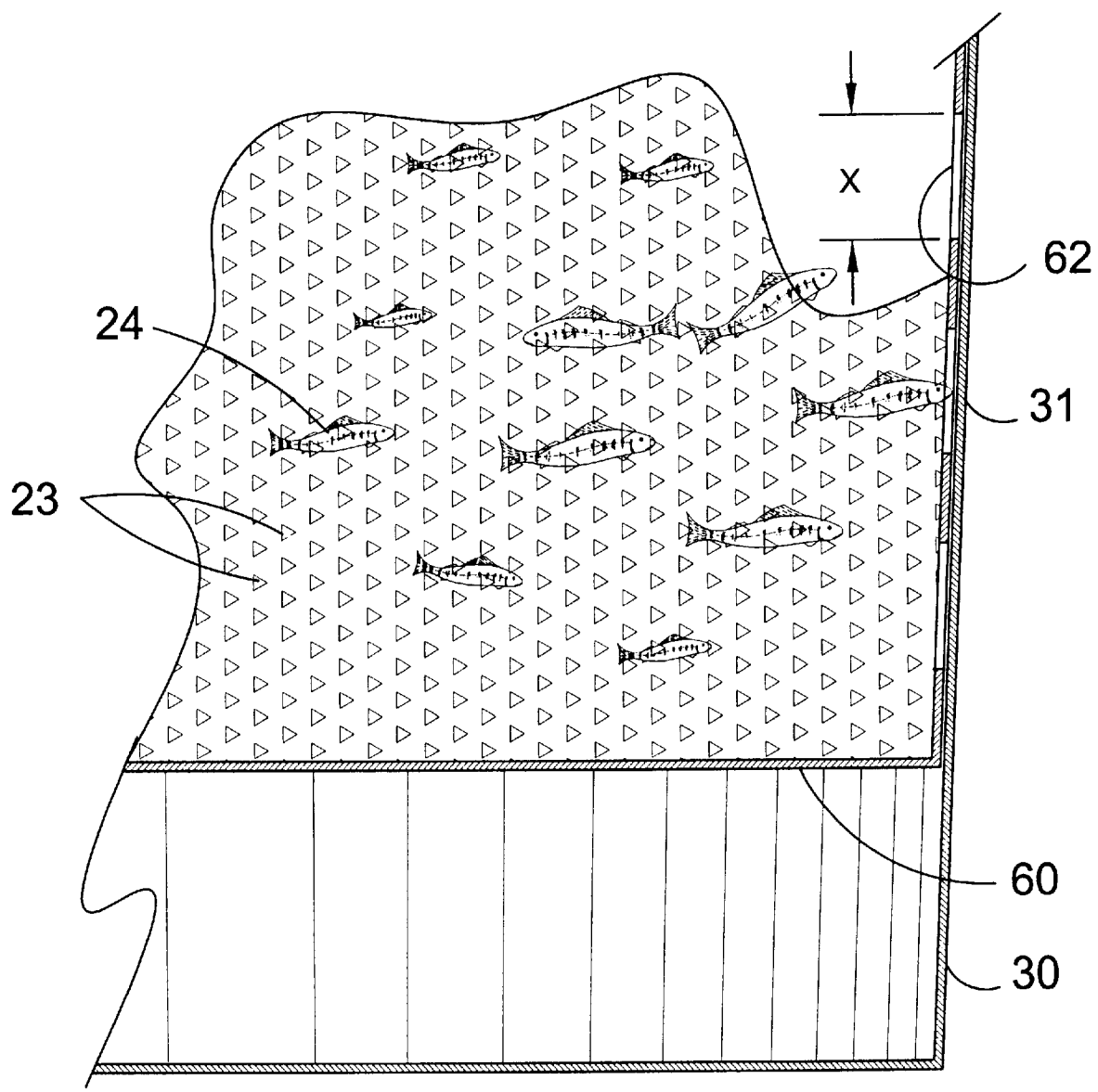

FIG. 8 is a detail sectional view of an exemplary embodiment of the present invention with the flow rate set to no flow. Vent openings in the self-sealing cover will allow small amounts of water exchange making this setting ideal for thawing chum soon to be used.

Figure 9:
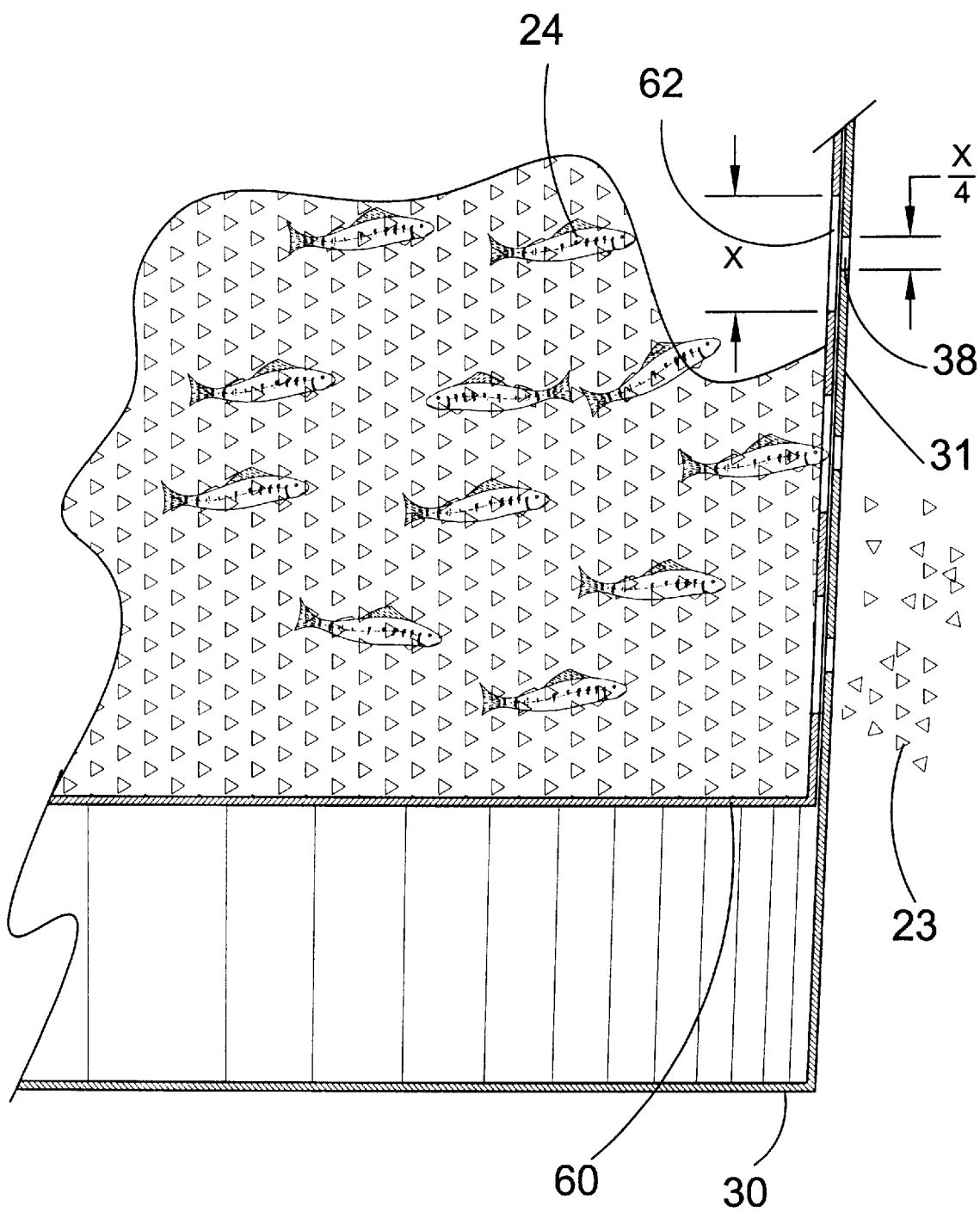

FIG. 9 is a detail sectional view of an exemplary embodiment of the present invention with the flow rate set to slow flow. The slow flow setting is generally ideal for live bait.

Figure 10:
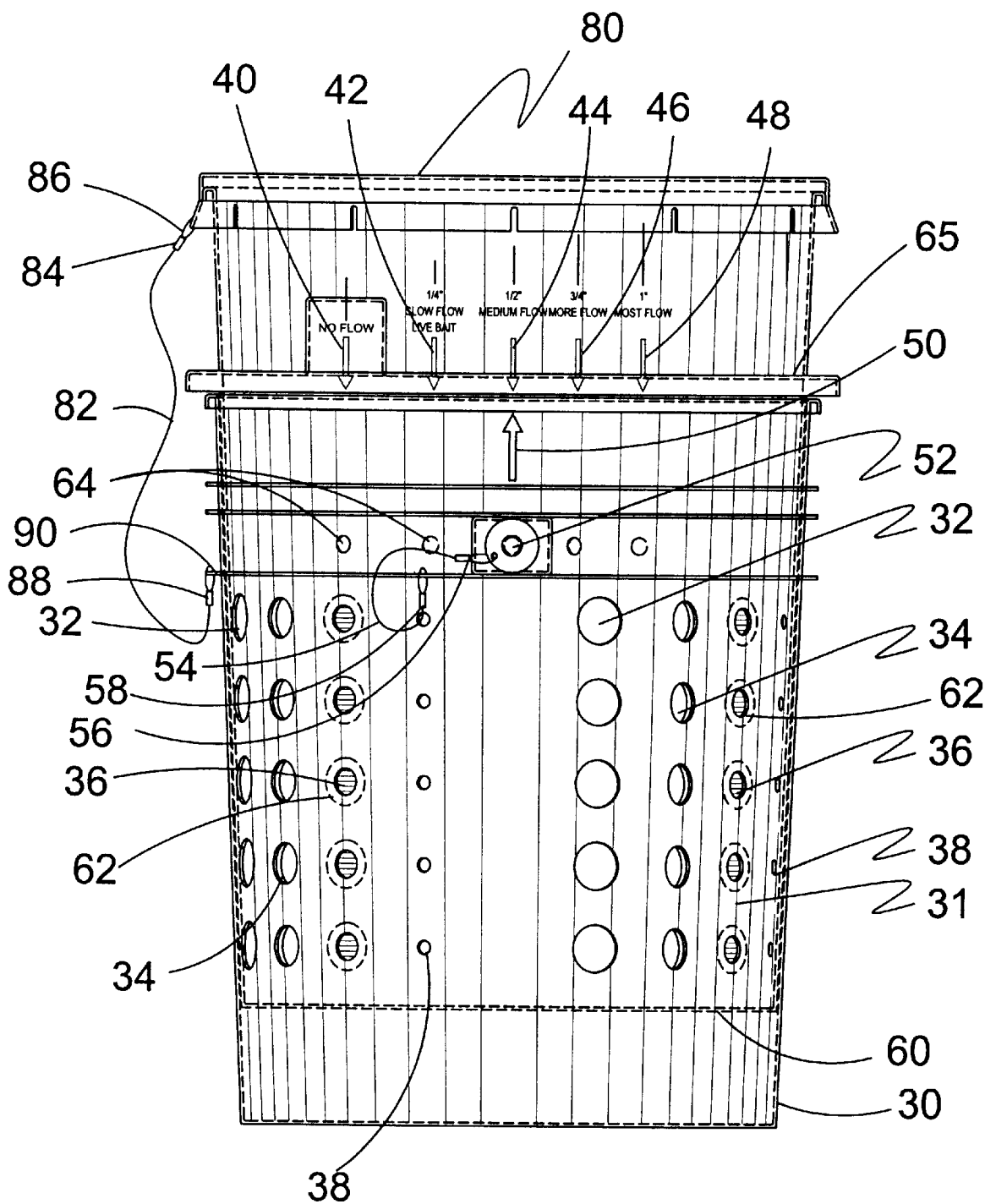

FIG. 10 is a front view of an exemplary embodiment of the present invention with the flow rate set to medium flow.

Figure 11:
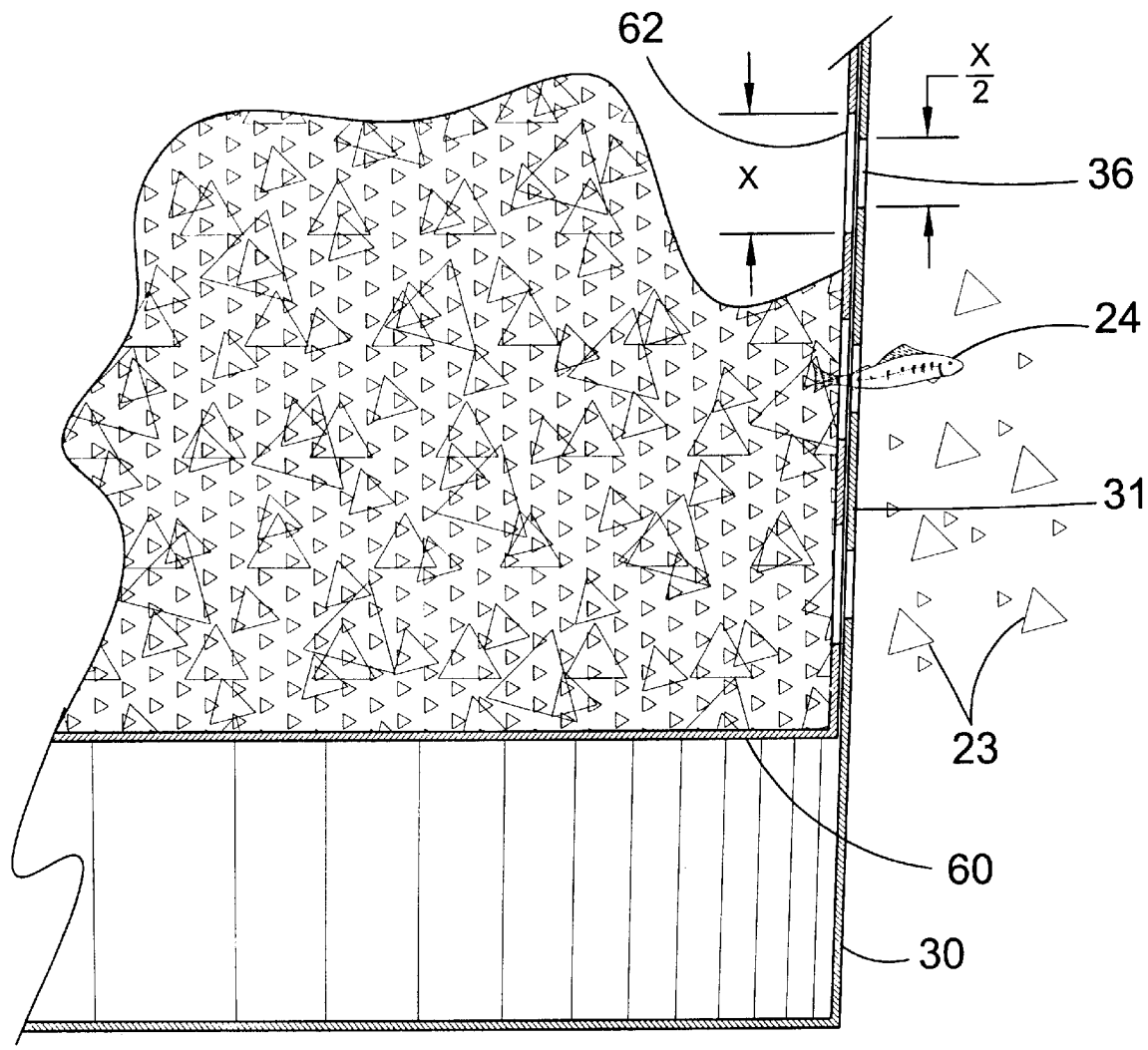

FIG. 11 is a detail sectional view of an exemplary embodiment of the present invention with the flow rate set to medium flow.

Figure 12:
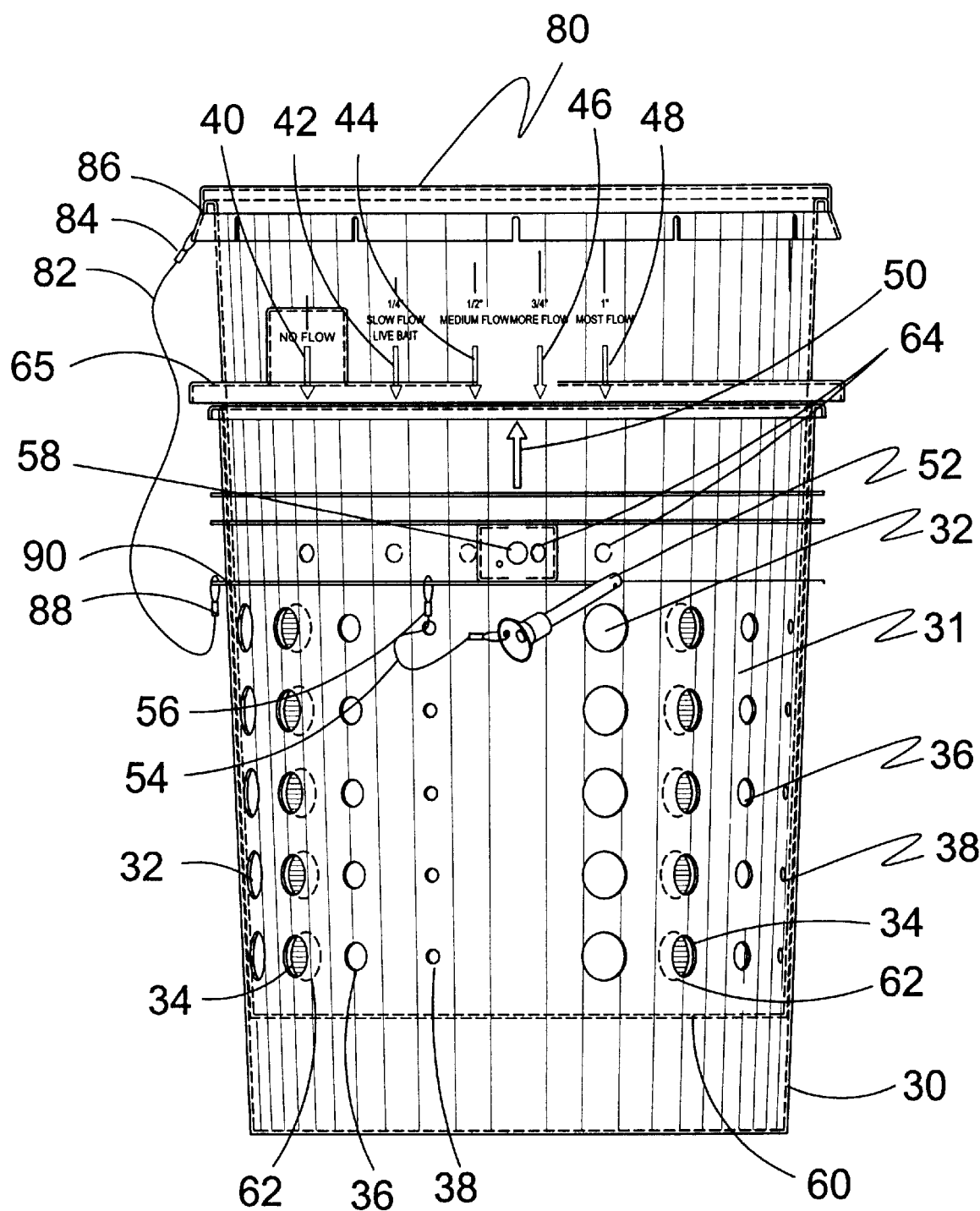

FIG. 12 is a front view of an exemplary embodiment of the present invention with the inner container rotated between the more flow and medium flow settings. The more flow openings are partially exposed and the alignment markings are misaligned. The locking pin cannot be locked into position when the markings and locking pin openings are misaligned.

Figure 13:
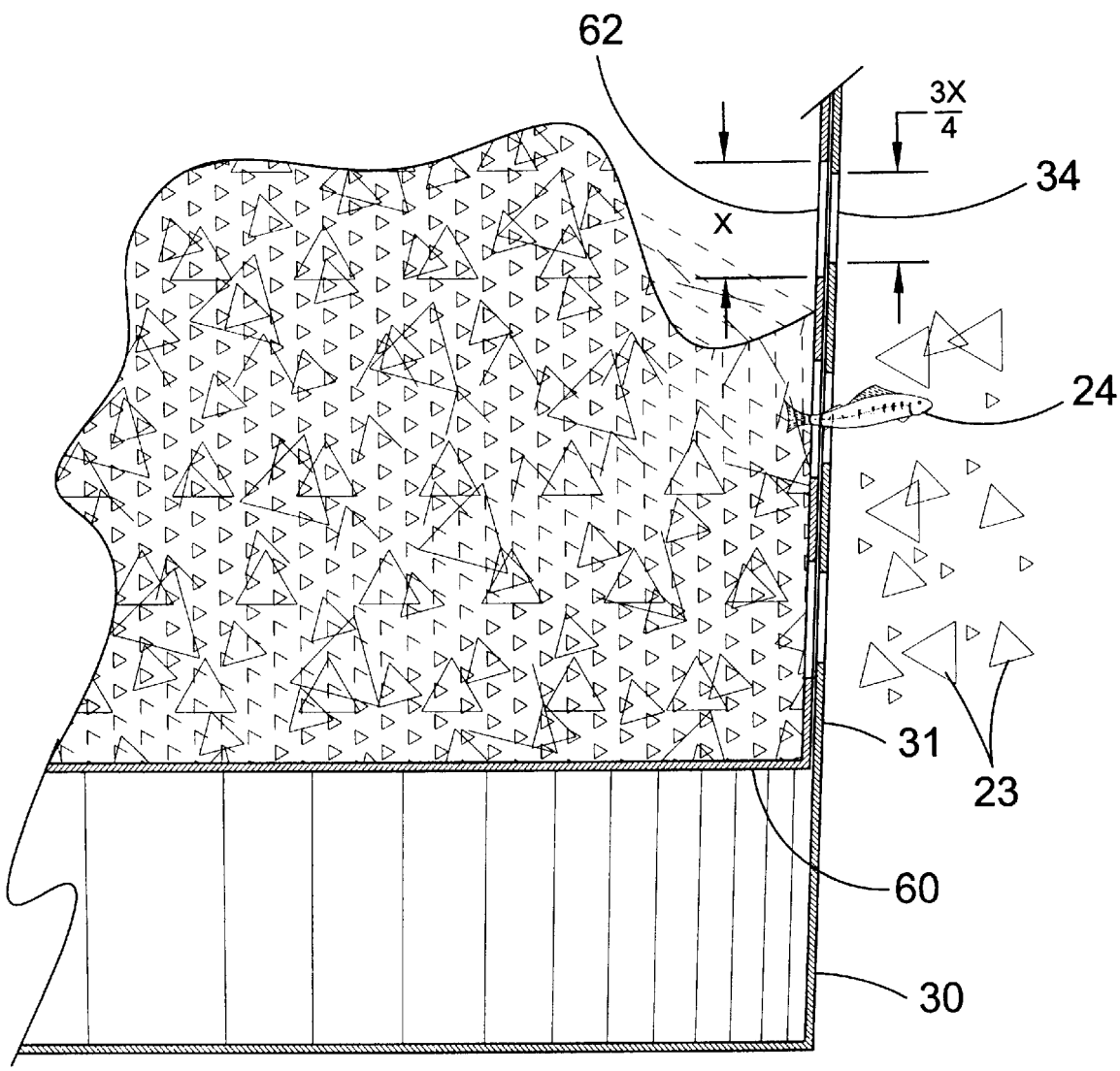

FIG. 13 is a detail sectional view of an exemplary embodiment of the present invention with the flow rate set to more flow.

Figure 14:
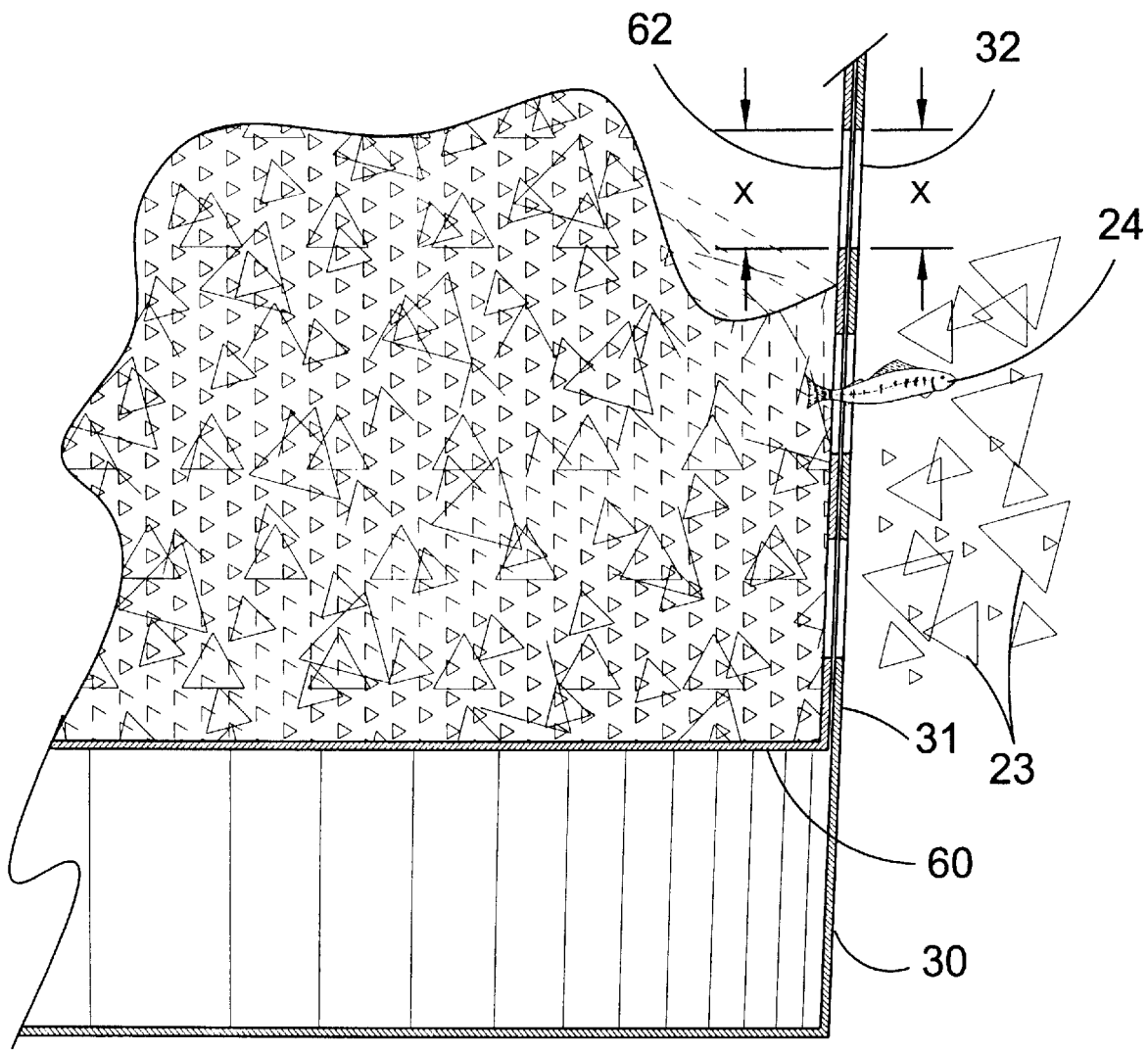

FIG. 14 is a detail sectional view of an exemplary embodiment of the present invention with the flow rate set to most flow.

DESCRIPTION OF THE REFERENCED NUMERALS

Turning now descriptively to the drawings, in which similar reference characters denote similar elements throughout the several views, the figures illustrate the present invention. With regard to the reference numerals used, the following numbering is used throughout the various drawing figures.

- 20 exemplary embodiment of the adjustable chum bucket of the present invention
- 21 user
- 22 boat
- 23 chum
- 24 live bait
- 30 outer container
- 32 outer container first plurality of openings in four vertically aligned column pluralities
- 34 outer container second plurality of openings in four vertically aligned column pluralities
- 36 outer container third plurality of openings in four vertically aligned column pluralities
- 38 outer container fourth plurality of openings in four vertically aligned column pluralities
- 40 inner container flow rate indicator for "NO FLOW"
- 42 inner container flow rate indicator for "SLOW FLOW"
- 44 inner container flow rate indicator for "MEDIUM FLOW"
- 46 inner container flow rate indicator for "MORE FLOW"
- 48 inner container flow rate indicator for "MOST FLOW"
- 50 outer container locking pin opening
- 52 locking pin
- 54 wire cable section
- 56 sleeve crimp
- 58 sleeve crimp
- 60 inner container
- 62 inner container plurality of openings
- 63 inner container top opening
- 64 inner container plurality of locking pin openings
- 65 inner container rim
- 70 inner container eyelet
- 72 tow rope
- 74 swivel
- 80 self-sealing lid with vents
- 82 wire cable
- 84 sleeve crimp
- 86 lid rim
- 88 sleeve crimp
- 89 outer container top rim
- 90 outer container side rim

DETAILED DESCRIPTION OF EXEMPLARY EMBODIMENTS OF THE INVENTION

The following discussion describes in detail exemplary embodiments of the invention. This discussion should not be construed, however, as limiting the invention to those particular embodiments. Practitioners skilled in the art will recognize numerous other embodiments as well. For a definition of the complete scope of the invention, the reader is directed to the appended claims.

Figure 1:
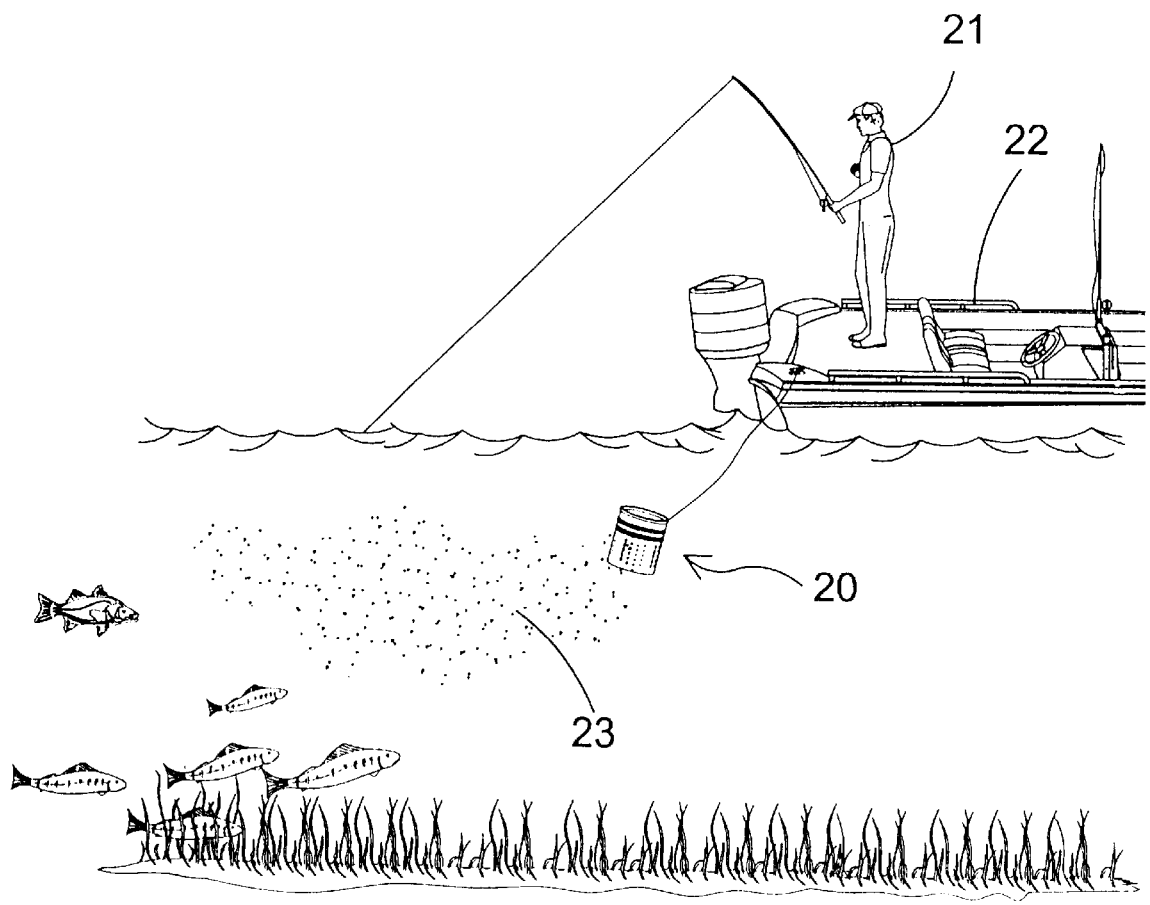

As shown in FIG. 1, the user 21 ties the adjustable chum bucket 20 to a drifting or trolling boat 22 such that chum 23 and other bait is released while the bucket 20 is submerged.

Turning now to FIGS. 2–6, one exemplary embodiment of the device 20 is illustrated and is shown to comprise a generally circular outer container 30, having a sidewall 31, the sidewall having a first plurality of openings 32, each opening in the first plurality being substantially the same size, a second plurality of openings 34, each opening in the second plurality of openings being substantially the same size, each of said openings being smaller than the first plurality openings, a third plurality of openings 36, each opening in the third plurality of openings being substantially the same size, each of said openings being smaller than the second plurality openings, and a fourth plurality of openings 38, each opening in the fourth plurality of openings being substantially the same size, each of said openings being smaller than the third plurality openings. The outer container has a top rim 89.

The device 20 also has a generally circular inner container 60, closely received by the outer container 30 for concentric rotation within the outer container, the inner container having a sidewall 61 and a top opening 63, the sidewall having a plurality of openings 62, each opening being substantially the same size, each opening being substantially the same size or smaller than the outer container first plurality of openings 32. The inner container has an enlarged rim 65 about the inner container circumference that seats on the outer container top rim 89.

The inner container plurality of openings 62 is positioned such that the inner container is rotatable to a first position wherein the inner container plurality of openings align with the outer container first plurality 32 of openings, a second position wherein the inner container plurality of openings align with the outer container second plurality 34 of openings, a third position wherein the inner container plurality of openings align with the outer container third plurality 36 of openings, a fourth position wherein the inner container plurality of openings align with the outer container fourth plurality 38 of openings, and at least one additional position wherein the inner container plurality of openings is unaligned with the outer container first, second, third, and fourth pluralities of openings.

Figure 4:
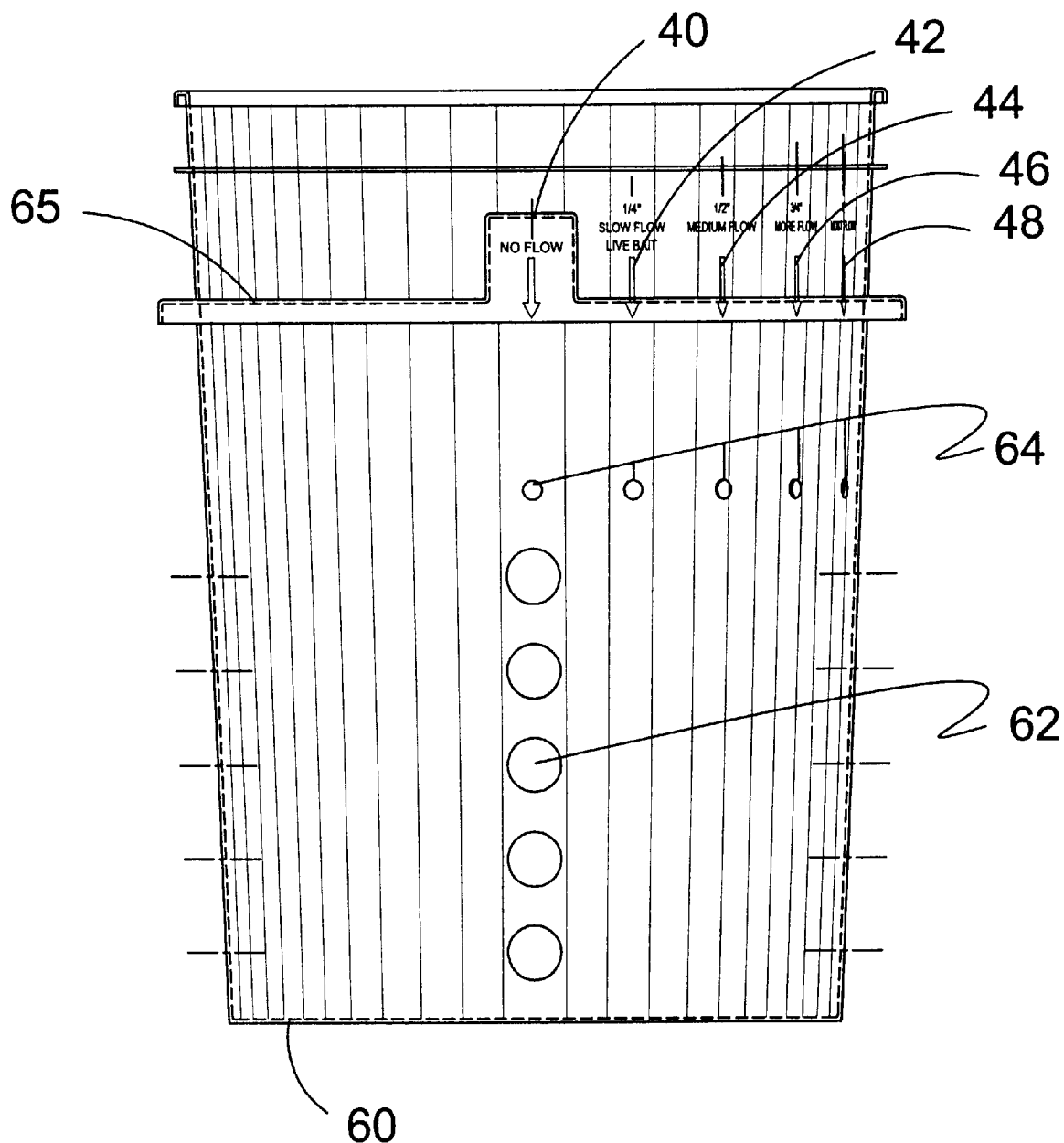
FIG. 4 is a front view of an exemplary embodiment of the present invention illustrating the inner container.

As shown in FIG. 4, the inner container 60 of the exemplary embodiment further comprises indicia indicating the relative degree of water flow at each inner container position, including indicia indicating no flow 40, slow flow 42, medium flow 44, more flow 46 and most flow 48. The outer container 30 has a pointer 50 that points to the applicable flow indicator on the inner container as the inner container rotates within the outer container.

FIG. 5 depicts the inner container eyelet 70 for the tow rope 72, the tow rope being attached to the eyelet with a swivel 74.

As illustrated in FIG. 4 and FIG. 6, this exemplary embodiment has a locking pin 52 and the outer container sidewall 31 further comprises a locking pin opening 50. The inner container sidewall 61 further comprises a plurality of locking pin openings 64, each inner container locking pin opening being singularly alignable with the outer container locking pin opening such that the locking pin is insertable in the outer container locking pin opening and the inner container locking pin opening so aligned. A small length of wire cable 54 is attached by a sleeve crimp 56 to a conventional plunger 59 that prevents the withdrawal of the pin 52 until the plunger is depressed. The wire cable attaches by a second sleeve crimp 58 to the circumferential rim 90 on the outer container 30.

In some embodiments, the locking means is a pin fixed on the outer container facing inwardly, the inner container being constructed of a material that is sufficiently resilient to pull the inner container locking pin hole from the fixed locking pin and rotate the inner container for the reinsertion of the fixed locking pin into another of the inner container locking pin openings.

Figure 2:
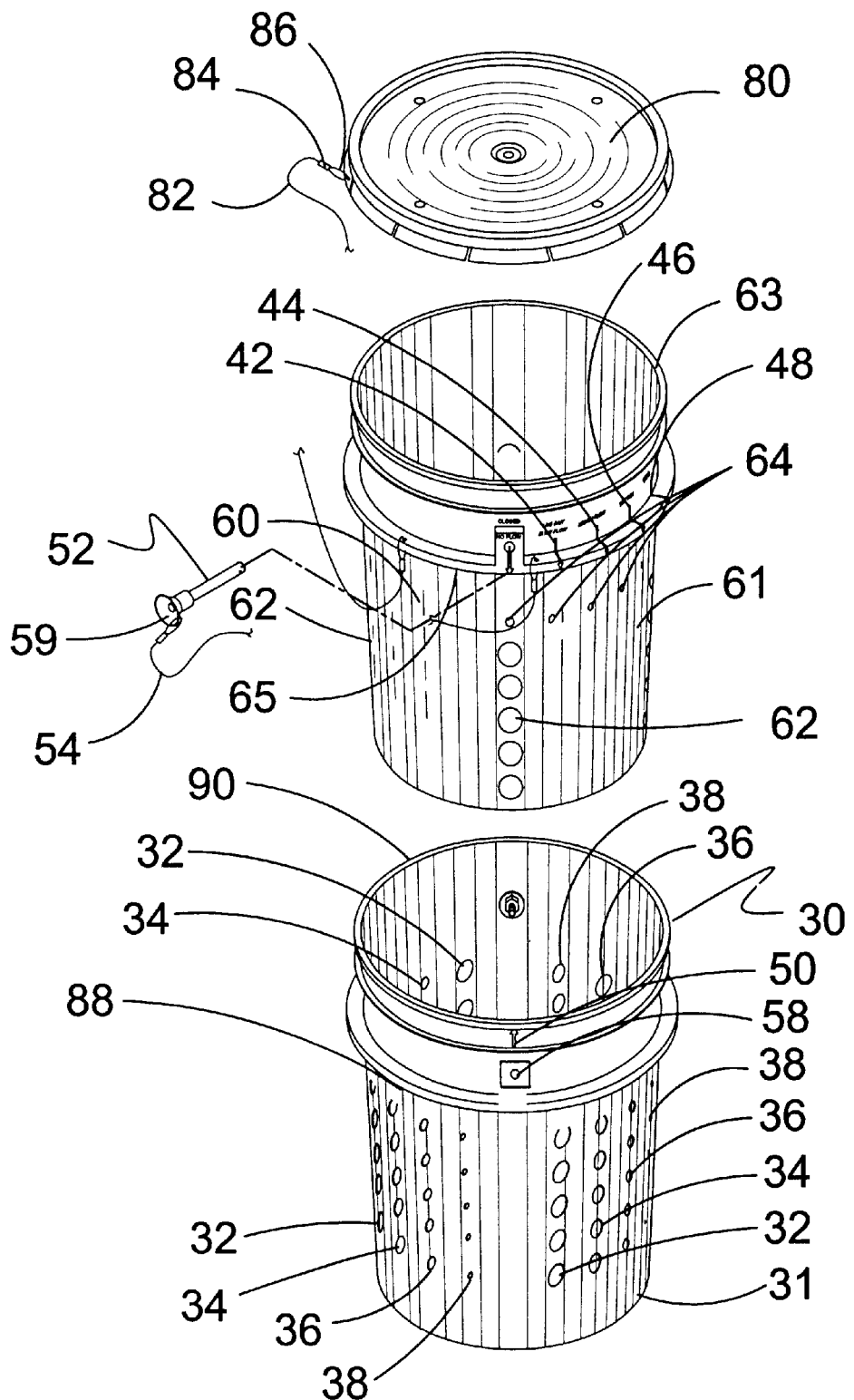
Figure 3:
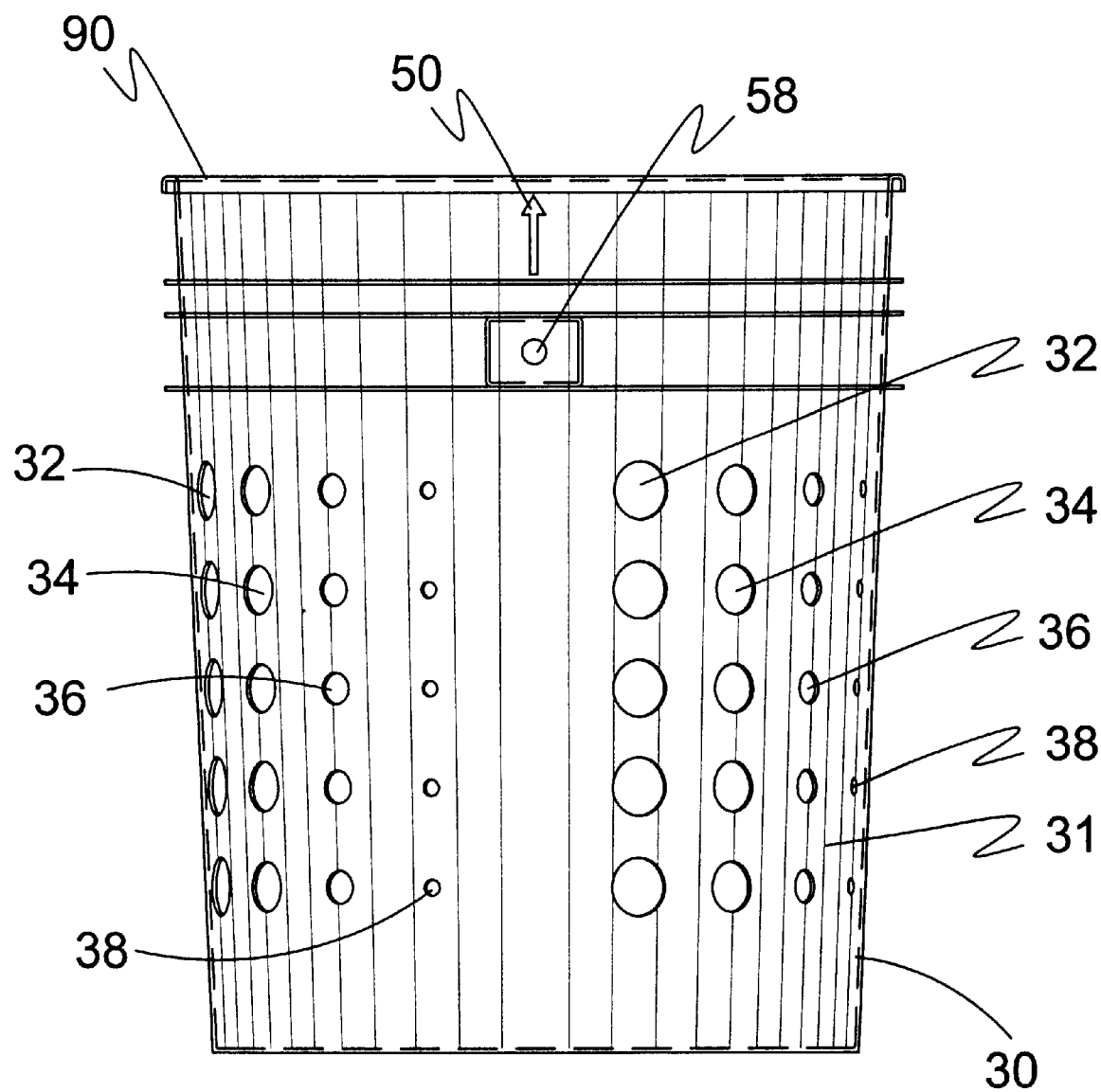
FIG. 3 is a front view of an exemplary embodiment of the present invention illustrating the outer container.

As shown in FIG. 2, this exemplary embodiment has a vented, self-sealing lid 80 to close the inner container top opening 63 after the chum has been loaded into the inner container 60. A small section of wire cable 82 is attached by a sleeve crimp 84 to a circumferential rim 86 on the lid, and by a second sleeve crimp 88 to the outer container circumferential rim 90.

In this exemplary embodiment, the outer container first plurality 32 of openings comprises four vertically aligned column pluralities of openings spaced equidistantly about the outer container circumference. Similarly, the outer container second plurality 34 of openings comprises four vertically aligned column pluralities of openings spaced equidistantly about the outer container circumference, the outer container third plurality 36 of openings comprises four vertically aligned column pluralities of openings spaced equidistantly about the outer container circumference, and the outer container fourth plurality 38 of openings comprises four vertically aligned column pluralities of openings spaced equidistantly about the outer container circumference. To utilize the four sets of outer container opening pluralities the inner container plurality 62 of openings comprises four vertically aligned column pluralities of openings spaced equidistantly about the outer container circumference, such that when the inner container 60 is in the first position the four inner container vertically aligned opening pluralities align with the four outer container opening pluralities of the outer container first opening plurality 32. In like fashion, the four inner container vertically aligned opening pluralities align with the four outer container opening pluralities of the outer container second opening plurality 34 when the inner container is in the second position, and so forth for the outer container third opening plurality 36 and fourth opening plurality 38. In some embodiments, two, three, and more than four such sets are provided on the outer container sidewall.

Turning now to FIG. 7 and FIG. 8, the exemplary embodiment of the device 20 is shown in the "NO FLOW" configuration, wherein the outer container pointer 50 is pointing to the "NO FLOW" indicator 40. The locking pin 52 has been inserted in the outer container locking pin opening 58 and on into the first inner container locking pin opening 64. When so configured, and as illustrated in FIG. 8, the outer container sidewall 31 blanks the inner container openings 62 allowing no chum or live bait to exit the device 20. As shown on FIG. 8, and for purposes of illustration, the diameter of each opening in the inner container plurality of openings 64 is set equal to "X".

Turning now to FIG. 9, the exemplary embodiment is shown with the outer container fourth plurality 38 of openings, representing the "SLOW FLOW" mode, aligned with the inner container plurality 62 of openings. In this mode, four vertically aligned pluralities within the fourth plurality 38 are aligned with the four pluralities within the inner container plurality 62. Typically sized live bait is unable to leave through the opening 38, which has a diameter of X/4 relative to openings 32. Only the smaller-sized chum 23 is able to escape. This allows the user 21 to preserve his live bait 24 in a healthy water environment, while still spreading small chum 23, including all chum smaller than X/4.

Turning now to FIG. 10 and FIG. 11, the exemplary embodiment of the device 20 is shown in the "MEDIUM FLOW" setting, as indicated by the outer container pointer 50 pointing to the "MEDIUM FLOW" indicator 44 on the inner container 60. The outer container third plurality 36 of openings, presented in four vertical patterns, aligns with the four vertically aligned opening pluralities in the inner container plurality of openings 62. FIG. 11 illustrates that the third plurality 36 openings have diameters equal to X/2 relative to the inner container plurality 62 of openings. In this mode, the typically sized live bait 24 will be able to exit through the aligned openings 62,36. Medium-sized chum 23 can also escape, including all chum smaller than X/2.

Turning now to FIG. 12, the exemplary embodiment of the device 20 is shown in an intermediate position between the "MORE FLOW" and "MEDIUM FLOW" flow rate modes, as shown by the outer container pointer 50 and the partially aligned openings 62,34. This intermediate position, being subject to much variation, is an undesirable mode. The user 21 is assisted in avoiding intermediate positions by virtue of the misalignment of the outer container locking pin opening 58 and the inner container locking pin openings 64. The user's inability to insert the locking pin 52 into misaligned openings alerts the user to the need to rotate the inner container 60 to an aligned position. The locking pin 52 cannot be inserted through both locking pin openings when the inner container has not been rotated to one of the aligned positions.

Turning now to FIG. 13, the exemplary embodiment of the device 20 is shown in the "MORE FLOW" setting. The outer container second plurality 34 of openings, presented in four vertical patterns, aligns with the four vertically aligned opening pluralities in the inner container plurality of openings 62. FIG. 13 illustrates that the second plurality 34 openings have diameters equal to 3X/4 relative to the inner container plurality 62 of openings. In this mode, the typically sized live bait 24 will be able to exit through the aligned openings 62,34. Larger sized chum 23 can also escape, including all chum smaller than 3X/4.

Turning now to FIG. 14, the exemplary embodiment of the device 20 is shown in the "MOST FLOW" setting. The outer container first plurality 32 of openings, presented in four vertical patterns, aligns with the four vertically aligned opening pluralities in the inner container plurality of openings 62. FIG. 14 illustrates that the first plurality 32 openings have diameters equal to X relative to the inner container plurality 62 of openings. In this mode, the typically sized live bait 24 will be able to exit through the aligned openings 62,36. Even larger sized chum 23 can also escape, including all chum smaller than X.

With respect to the above description then, it is to be realized that the optimum material and dimensional relationships for the parts of the adjustable chum bucket 20, will include variations in size, materials, shape, and form, which will occur to those skilled in the art upon review of the present disclosure. For example, the containers are constructed in various embodiments of metals and plastics of various weights and densities. In various embodiments, the sizes and relative sizes of the openings are of different sizes. In some embodiments the multiple pluralities of openings are in the inner container sidewall and the openings shown on the inner container sidewall above, are on the outer container sidewall, thus reversing the position of the outer and inner container openings.

All equivalent relationships to those illustrated in the drawings and described in the specification are intended to be encompassed by the present invention.

What is claimed as new and desired to be protected by Letters Patent is set forth in the appended claims:

1. A device for releasing bait of various sizes while submerged in water, the device comprising;
    a generally circular outer container, having a sidewall, the sidewall having a first plurality of openings, each opening in the first plurality being substantially the same size, a second plurality of openings, each opening in the second plurality of openings being substantially the same size, each of said openings being smaller that the first plurality openings,
    a generally circular inner container having a top opening, the inner container being closely received by the outer container for concentric rotation within the outer container, the inner container having a sidewall, the sidewall having a plurality of openings, each opening being substantially the same size, each opening being substantially the same size or smaller than the outer container first plurality of openings, the inner container plurality of openings being positioned such that the inner container is rotatable to:
        a first position wherein the inner container plurality of openings aligns with the outer container first plurality of openings;
        a second position wherein the inner container plurality of openings aligns with the outer container second plurality of openings;
        at least one additional position wherein the inner container plurality of openings is unaligned with the outer container first and second plurality of openings;
    a closing member for closing the inner container top openings;
    a locking device for fixing the inner container in the first, the second, or the at least one additional position;
    the outer container first plurality of openings comprises four vertically aligned plurality of openings spaced equidistantly about the outer container circumference;
    the outer container second plurality of openings comprises four vertically aligned pluralities of openings spaced equidistantly about the outer container circumference; and
    the inner container plurality of openings comprises four vertically aligned pluralities of openings spaced equidistantly about the outer container circumference, such that when the inner container is in the first position the four inner container vertically aligned opening pluralities align with the four outer container opening pluralities of the outer container first opening plurality.

2. The device of claim 1, wherein the outer container sidewall pluralities of openings are circular and the inner container plurality of openings are circular.

3. The device of claim 1, wherein the inner container further comprises indicia indicating the position of the inner container.

4. The device of claim 3, wherein the indicia also indicates a relative amount of flow at each inner container position.

5. A device for releasing bait of various sizes while submerged in water, the device comprising:
    a generally circular outer container, having a sidewall, the sidewall having:
        a first plurality of openings, each opening in the first plurality being substantially the same size,
        a second plurality of openings, each opening in the second plurality of openings being substantially the same size, each of said openings being smaller than the first plurality openings,
        a third plurality of openings, each opening in the third plurality of openings being substantially the same size, each of said openings being smaller than the second plurality openings,
        a fourth plurality of openings, each opening in the fourth plurality of openings being substantially the same size, each of said openings being smaller than the third plurality openings,
    a generally circular inner container, closely received by the outer container for concentric rotation within the outer container, the inner container having a sidewall and a top opening, the sidewall having a plurality of openings, each opening being substantially the same size, each opening being substantially the same size or smaller than the outer container first plurality openings, the inner container plurality of openings being positioned such that the inner container is rotatable to:
        a first position wherein the inner container plurality of openings aligns with the outer container first plurality of openings;
        a second position wherein the inner container plurality of openings aligns with the outer container second plurality of openings;
        a third position wherein the inner container plurality of openings aligns with the outer container third plurality of openings;
        a fourth position wherein the inner container plurality of openings aligns with the outer container fourth plurality of openings;
        at least one additional position wherein the inner container plurality of openings is unaligned with the outer container first, second, third, and fourth plurality of openings, the inner container further comprising indicia indicating the relative degree of water flow at each inner container position;
    a locking pin, the outer container sidewall further comprising a locking pin opening, and the inner container sidewall further comprising a plurality of locking pin openings, each inner container locking pin opening being singularly alignable with the outer container locking pin opening, the locking pin being fixedly insertable in the outer container locking pin opening and the inner container locking pin opening so aligned; and
    a lid for closing the inner container top opening, and further wherein:
        the outer container first plurality of openings comprises four vertically aligned pluralities of openings spaced equidistantly about the outer circumference;
        the outer container second plurality of openings comprises four vertically aligned pluralities of openings spaced equidistantly about the outer container circumference;

the outer container third plurality of openings comprises four vertically aligned pluralities of openings spaced equidistantly about the outer container circumference;

the outer container fourth plurality of openings comprises four vertically aligned pluralities of openings spaced equidistantly about the outer container circumference; and the inner container plurality of openings comprises four vertically aligned pluralities of openings spaced equidistantly about the outer container circumference, such that when the inner container is in the first position the four inner container vertically aligned opening pluralities align with the four outer container opening pluralities of the outer container first opening plurality.

6. A device for releasing bait of various sizes while submerged in water, the device comprising:

a generally circular inner container having a top opening and a sidewall, the side wall having:
  a first plurality of openings, each opening in the first plurality being substantially the same size,
  a second plurality of openings, each opening in the second plurality of openings being substantially the same size, each of said openings being smaller than the first plurality openings, a generally circular outer container, closely receiving the inner container for concentric rotation within the outer container, the outer container having a sidewall, the sidewall having a plurality of openings, each opening being substantially the same size, each opening being substantially the same size or smaller than the inner container first plurality openings, the outer container plurality of openings being positioned such that the inner container is rotatable to:
  a first position wherein the outer container plurality of openings aligns with the inner container first plurality of openings;
  a second position wherein the outer container plurality of openings aligns with the inner container second plurality of openings;
  at least one additional position wherein the outer container plurality of openings is unaligned with the inner container first and second plurality of openings;

a lid for closing the inner container; and a locking device for fixing the inner container in the first, the second, or the at least one additional position.

7. A device for releasing bait of various sizes while submerged in water, the device comprising;

a generally circular outer container, having a sidewall, the sidewall having a first plurality of openings, each opening in the first plurality being substantially the same size, a second plurality of openings, each opening in the second plurality of openings being substantially the same size, each of said openings being smaller that the first plurality openings, a generally circular inner container having a top opening, the inner container being closely received by the outer container for concentric rotation within the outer container, the inner container having a sidewall, the sidewall having a plurality of openings, each opening being substantially the same size, each opening being substantially the same size or smaller than the outer container first plurality of openings, the inner container plurality of openings being positioned such that the inner container is rotatable to:
  a first position wherein the inner container plurality of openings aligns with the outer container first plurality of openings;
  a second position wherein the inner container plurality of openings aligns with the outer container second plurality of openings;
  at least one additional position wherein the inner container plurality of openings is unaligned with the outer container first and second plurality of openings;

a closing member for closing the inner container top openings;

a locking device for fixing the inner container in the first, the second, or the at least one additional position; and the locking device further comprises a locking pin, the outer container sidewall further comprises a locking pin opening, and the inner container sidewall further comprises a plurality of locking pin openings, each inner container locking pin opening being singularly alignable with the outer container locking pin opening, the locking pin being fixedly insertable in the outer container locking pin opening and the inner container locking pin opening so aligned.

8. A device for releasing bait of various sizes while submerged in water, the device comprising;

a generally circular outer container, having a sidewall, the sidewall having a first plurality of openings, each opening in the first plurality being substantially the same size, a second plurality of openings, each opening in the second plurality of openings being substantially the same size, each of said openings being smaller that the first plurality openings, a generally circular inner container having a top opening, the inner container being closely received by the outer container for concentric rotation within the outer container, the inner container having a sidewall, the sidewall having a plurality of openings, each opening being substantially the same size, each opening being substantially the same size or smaller than the outer container first plurality of openings, the inner container plurality of openings being positioned such that the inner container is rotatable to:
  a first position wherein the inner container plurality of openings aligns with the outer container first plurality of openings;
  a second position wherein the inner container plurality of openings aligns with the outer container second plurality of openings;
  at least one additional position wherein the inner container plurality of openings is unaligned with the outer container first and second plurality of openings;

a closing member for closing the inner container top openings;

a locking device for fixing the inner container in the first, the second, or the at least one additional position, the outer container sidewall has a third plurality of openings, each opening in the third plurality of openings being substantially the same size, each of said openings being smaller than the second plurality of openings, the inner container is rotatable to a position such that the inner container plurality of openings aligns with the outer container third plurality of openings, and the locking device fixes the inner container in position.

9. The device of claim 8, wherein outer container sidewall has a fourth plurality of openings, each opening in the fourth plurality of openings being substantially the same size, each of said openings being smaller than the third plurality of openings, the inner container is rotatable to a position such that the inner container plurality of openings aligns with the outer container fourth plurality of openings, and the locking device fixes the inner container in position.

10. A device for releasing bait of various sizes while submerged in water, the device comprising;

a generally circular outer container, having a sidewall, the sidewall having a first plurality of openings, each opening in the first plurality being substantially the same size, a second plurality of openings, each opening in the second plurality of openings being substantially the same size, each of said openings being smaller that the first plurality openings, a generally circular inner container having a top opening, the inner container being closely received by the outer container for concentric rotation within the outer container, the inner container having a sidewall, the sidewall having a plurality of openings, each opening being substantially the same size, each opening being substantially the same size or smaller than the outer container first plurality of openings, the inner container plurality of openings being positioned such that the inner container is rotatable to:

a first position wherein the inner container plurality of openings aligns with the outer container first plurality of openings;

a second position wherein the inner container plurality of openings aligns with the outer container second plurality of openings;

at least one additional position wherein the inner container plurality of openings is unaligned with the outer container first and second plurality of openings;

a closing member for closing the inner container top openings;

a locking device for fixing the inner container in the first, the second, or the at least one additional position; and the outer container sidewall further comprises at least one additional plurality of openings, the openings in each plurality being substantially the same size, the openings in each of the additional pluralities being smaller than the outer container third plurality of openings and larger than the openings in each succeeding additional plurality, the inner container being rotatable such that each additional plurality of openings aligns with the inner container plurality of openings, the inner container being fixable by the locking device in such an aligned position for each additional plurality.

* * * * *